United States Patent [19]

Bradley et al.

[11] Patent Number: 5,168,351
[45] Date of Patent: Dec. 1, 1992

[54] SHORT FOCAL LENGTH VIDEO COLOR PROJECTOR EMPLOYING DICHROIC MIRROR BLOCK

[75] Inventors: Ralph H. Bradley, Kingsport, Tenn.; Leendert Vriens, Eindhoven; William F. Guerinot, Knoxville, Tenn.; Jill F. Goldenberg, Pelham Manor, N.Y.

[73] Assignee: North American Philips Corporation, New York, N.Y.

[21] Appl. No.: 523,970

[22] Filed: May 16, 1990

[51] Int. Cl.$^5$ .............................. H04N 9/31
[52] U.S. Cl. ........................ 358/60; 358/64; 358/231; 359/648; 359/649
[58] Field of Search .............. 358/60, 61, 62, 63, 358/64, 65, 56, 237, 231; 350/412, 432, 438; 313/474; 359/648, 649

[56] References Cited

U.S. PATENT DOCUMENTS

| | | | |
|---|---|---|---|
| 2,642,487 | 6/1953 | Schroder | 358/60 |
| 4,151,554 | 4/1979 | Tucker | 358/60 |
| 4,249,205 | 2/1981 | Buchroeder | 358/60 |
| 4,607,280 | 3/1986 | Kurg | 358/64 |
| 4,755,868 | 7/1988 | Hodges | 358/60 |
| 4,764,806 | 8/1988 | Altman | 358/60 |
| 4,777,532 | 10/1988 | Hasegawa | 358/231 |
| 4,804,884 | 2/1989 | Vriens et al. | 358/237 |
| 4,807,014 | 2/1989 | Van Gorkum et al. | 358/65 |

OTHER PUBLICATIONS

A Single Lens Three-CRT Crossed Dichroic Color Projector for DATA and Video (Sid International Symposium Digest of Technical Papers May 1985) Terry C. Schmidt.

Primary Examiner—James J. Groody
Assistant Examiner—Michael H. Lee
Attorney, Agent, or Firm—Leroy Eason

[57] ABSTRACT

A video color image projector which includes a block of crossed dichroic mirrors for combining the light rays from image rasters on respective monochrome image display devices and a projection lens for projecting the composite color rays so as to form an enlarged color image on a display screen. Each display device has a faceplace which is convex on the interior surface thereof and having thereon an interference filter in the form of an internal angularly reflecting coating (IARC). Each faceplate is liquid - coupled to a negative power lens element, so that the faceplate, coupling liquid (or gel) and such lens element effectively constitute a single negative power field flattener lens at each entrance side of the dichroic block. The composite color rays at the exit side of the dichroic block are projected on the display screen by an assembly of lens elements which includes at least one optically positive lens element. The focal length of the complete projection lens formed by such assembly and each of the negative field flattener lenses may be from 0.5 to 0.9 times the diagonal D of the image raster on each display device, so that the projector is sufficiently compact to be included in a cabinet suitable for consumer television receivers.

12 Claims, 3 Drawing Sheets

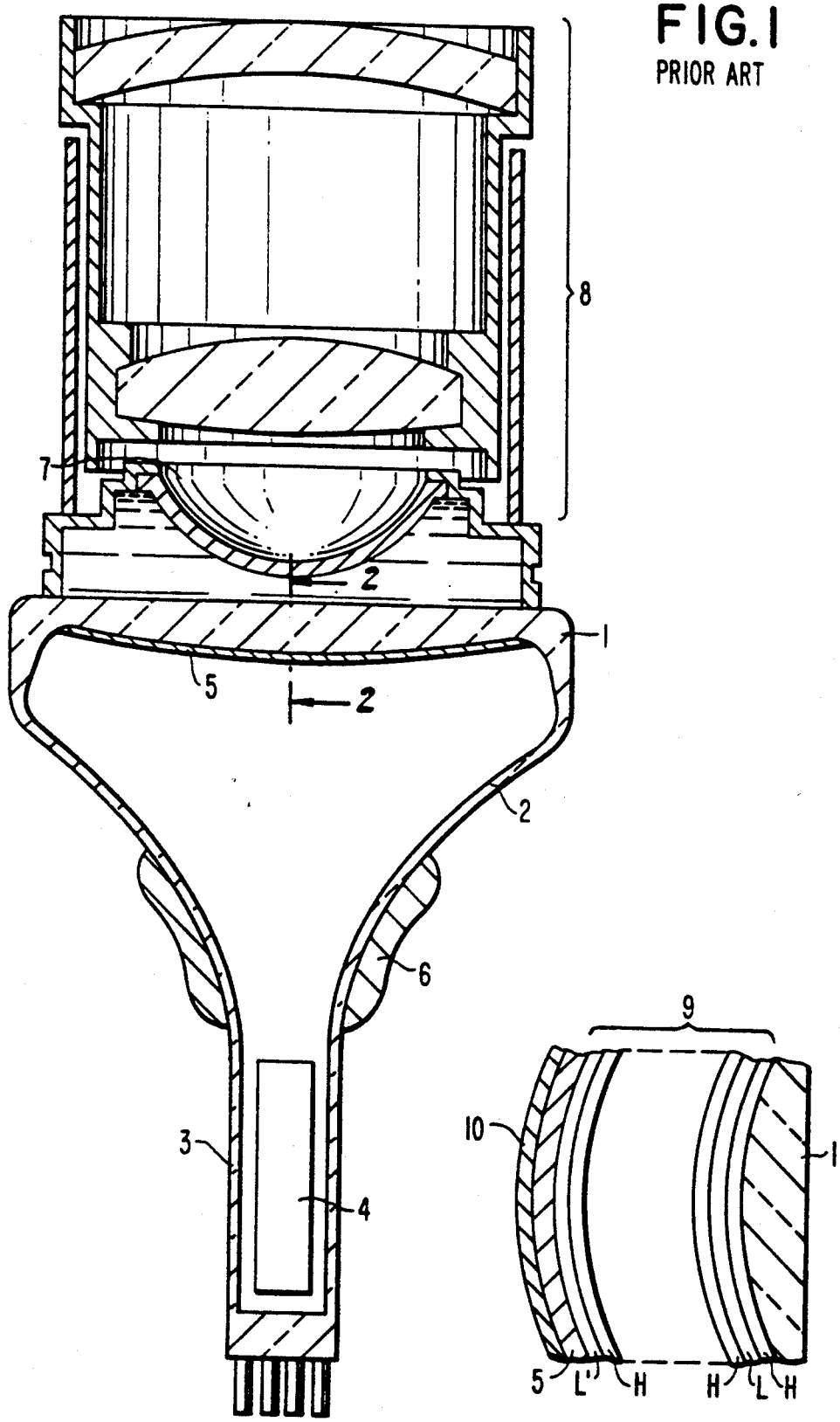

SHORT FOCAL LENGTH VIDEO COLOR PROJECTOR EMPLOYING DICHROIC MIRROR BLOCK

1. Field of the Invention

This invention relates to video color projection, and particularly to a video color projector employing a block of crossed dichroic mirrors and a projection lens of relatively short focal length for projecting on a display screen an enlarged color image derived from respective monochrome images produced on the screens of monochrome display devices.

2. Description of the Related Art

Video color projectors enable an enlarged color image to be produced from relatively small monochrome display devices which each produce respective primary color components of the composite color image, such as red, blue and green. The monochrome display devices can be cathode ray picture tubes (CRTs), or illuminated thin film liquid crystal panels (TFTs). The composite color image may be projected on the front of a reflective screen and viewed in reflection, or projected on the rear of a transmissive screen and viewed in transmission. Because rear projectors are self-contained and more compact, and provide ambient light rejection to achieve improved contrast, the majority of video projectors employ rear projection. In either case, the size of the projected color image on the display screen is determined to a considerable degree by the optical length, or "throw distance", of the path from the monochrome display devices to the screen. In order to reduce the required cabinet depth, such path is generally folded back by reflection from one or more mirrors.

A significant factor in the cost of the projector and the luminance of the projected image is the lens package employed. In one type of projector the monochrome display devices are in-line, each having its own projection lens adjacent the faceplate, and oriented so that the respective monochrome displays converge at the screen. However, it is difficult to achieve and maintain accurate convergence, e.g. since the three projected displays are not projected along a common axis there will be trapezoidal distortion in the composite image on the screen necessitating correction by shaping of the waveforms which produce the image raster on each display device. The use of three projection lenses also greatly increases the cost of the projector. Nevertheless, because such in-line projectors can employ a projection lens with a relatively short focal length and consequent short optical throw distance, they can be included in a cabinet of reasonable size and so are widely used in consumer projection television sets.

An alternative type of color projector includes a pair of dichroic mirrors which cross each other, generally at right angles, forming a dichroic block. Such dichroic mirrors are wavelength selective. Thus each dichroic mirror will reflect light of one primary color and transmit light of the other two primary colors, the sum of the transmission and reflection coefficients being nearly unity. In addition to wavelength, the reflection coefficient is also a function of the angle of incidence of light on the mirror and the polarization of the incident light. Since each of the monochrome displays is of a different primary color, each dichroic mirror will reflect the light from one monochrome display but transmit the light from the other two monochrome displays. A projection lens at the exit of the block collects the combined light from all three display and focuses it on a display screen where it forms the composite color display. Such projectors avoid the problems with convergence and trapezoidal distortion encountered with in-line projectors, because the three monochrome images are projected along a common axis. Also, since only a single projection lens is required, by adjusting its optical throw (projection) distance or the focal length of the lens, e.g. if it is a zoom lens, the same projector can be used for several different display screen sizes. However, because of the presence of the dichroic block, for which space must be provided in the light path, a dichroic projector needs a significantly longer focal length and longer optical throw distance than an in-line projector. The longer focal length is also required because of the limited angular and wavelength range in which dichroic mirrors can correctly combine the three monochrome images. Because of these advantages and disadvantages, dichroic projection has thus far been used almost exclusively in professional front projection systems, wherein a much longer optical throw distance can be employed than in a consumer rear projector wherein cabinet depth is limited.

Typical prior art in-line and dichroic projection systems are disclosed in U.S. Pat. No. 4,804,884, issued Feb. 14, 1989. Such patent, and also U.S. Pat. No. 4,683,398, issued Jul. 28, 1987, further describe providing an interference filter in the form of an internal angularly reflective coating (IARC) on a curved faceplate of a display device. IARC provides improved brightness and color, and a curved faceplate is helpful in maintaining the brightness at the corners of the projected image relative to the brightness at the center when IARC is used.

A different type of dichroic projector, providing improved image luminance, is described in the article "A Single-lens Three-CRT Crossed Dichroic Color Projector for Data and Video" by T.C. Schmidt, SID Digest, May, 1985. Therein each CRT has a strongly curved negative power focus field correction or "field flattener" lens element adjacent its faceplate, and a double convex positive power lens element between the field flattener and dichroic mirror block. The other elements of the projection lens are on the opposite side of the dichroic block. While this achieves some reduction of the focal length of the projection lens and throw distance to the display screen, it is still not sufficiently compact for inclusion in a consumer television cabinet and requires a positive lens element between each faceplate and the dichroic mirror block.

Despite the teachings in the above prior art concerning dichroic block projectors employing CRTs having curved faceplates with interference filters deposited thereon, such projectors have not been employed for consumer projection television sets because they have required long focal lengths and optical throw distances for a given image magnification. Herein, the focal length "f" is defined to be "long" if f>D, where D is the diagonal of the CRT raster; "medium" is from D down to nearly 0.8 D; and "short" is 0.8 D or less. "Short" focal lengths have not heretofore been feasible with dichroic mirror projectors, and although focal lengths as short as 0.5 D can be employed with a 3 CRT-3 lens projector there is then the considerable added expense of a multiplicity of positive power objective lenses and problems with convergence as described above.

SUMMARY OF THE INVENTION

The present invention provides a dichroic projector suitable for rear projection and having a projection lens of significantly reduced focal length, such as 0.8 D and possibly as short as 0.6 D. It is based on Applicant's discovery that by employing monochrome image display devices having convex faceplates of moderate curvature and with a interference filter in the form of an IARC coating thereon, and providing only a single lens element of negative optical power adjacent each faceplate, the light collection efficiency is virtually the same as when the negative power element and also one or two positive power elements are provided between each of the respective faceplates and the dichroic block. That is largely a consequence of the fact that the IARC filter reduces the angular range of light emission from each faceplate. Although omission of an additional lens element of positive power between the faceplate and the dichroic block results in increased overall angular divergence of the light incident on the dichroic mirrors, Applicants have found that such divergence is greatest at or near the center of the mirror and smallest near the edges, and that the divergence near the center remains almost the same regardless whether one or two lens elements are present at the entrance side of the mirror. Consequently, by including only a single lens element, that being the field flattener, at each entrance side to the dichroic block, a much smaller focal length lens assembly becomes possible.

Based on the aforesaid discovery, a color video image projector in accordance with the invention comprises three monochrome image display devices which respectively produce on the faceplates thereof respective monochrome components of a composite color video image, each faceplate being convexly curved toward the interior of the device and having an interference filter thereon in the form of an IARC coating. The radius of curvature is preferably between 2 and 4 times the faceplate diagonal D. A pair of crossed dichroic mirrors form a dichroic block which is positioned between the display devices, so that light from the faceplate of each display device enters a respective entrance side of the dichroic block and exits the block combined with light from the other display devices. Between the faceplate of each monochrome display device and the dichroic block there is provided a single lens element of negative optical power, the field flattener. At the exit side of the block is provided all other lens elements, including at least one positive lens element, in order to constitute together with the aforesaid single lens elements an objective lens for projecting light from the exit side of the dichroic block on a display screen. Such a projector may be further characterized in that the focal length f of the objective lens is $0.5\ D > f > 0.9\ D$, and preferably $< 0.8\ D$.

BRIEF DESCRIPTION OF THE DRAWINGS

A more complete description of the invention is given below with reference to the accompanying drawings, in which:

FIG. 1 shows a CRT and projection lens assembly as employed in a prior art form of 3 CRT-3 lens video projector;

FIG. 2 shows an IARC interference filter deposited on the faceplate of the CRT in FIG. 1;

DESCRIPTION OF THE PREFERRED EMBODIMENTS

Figure 3:
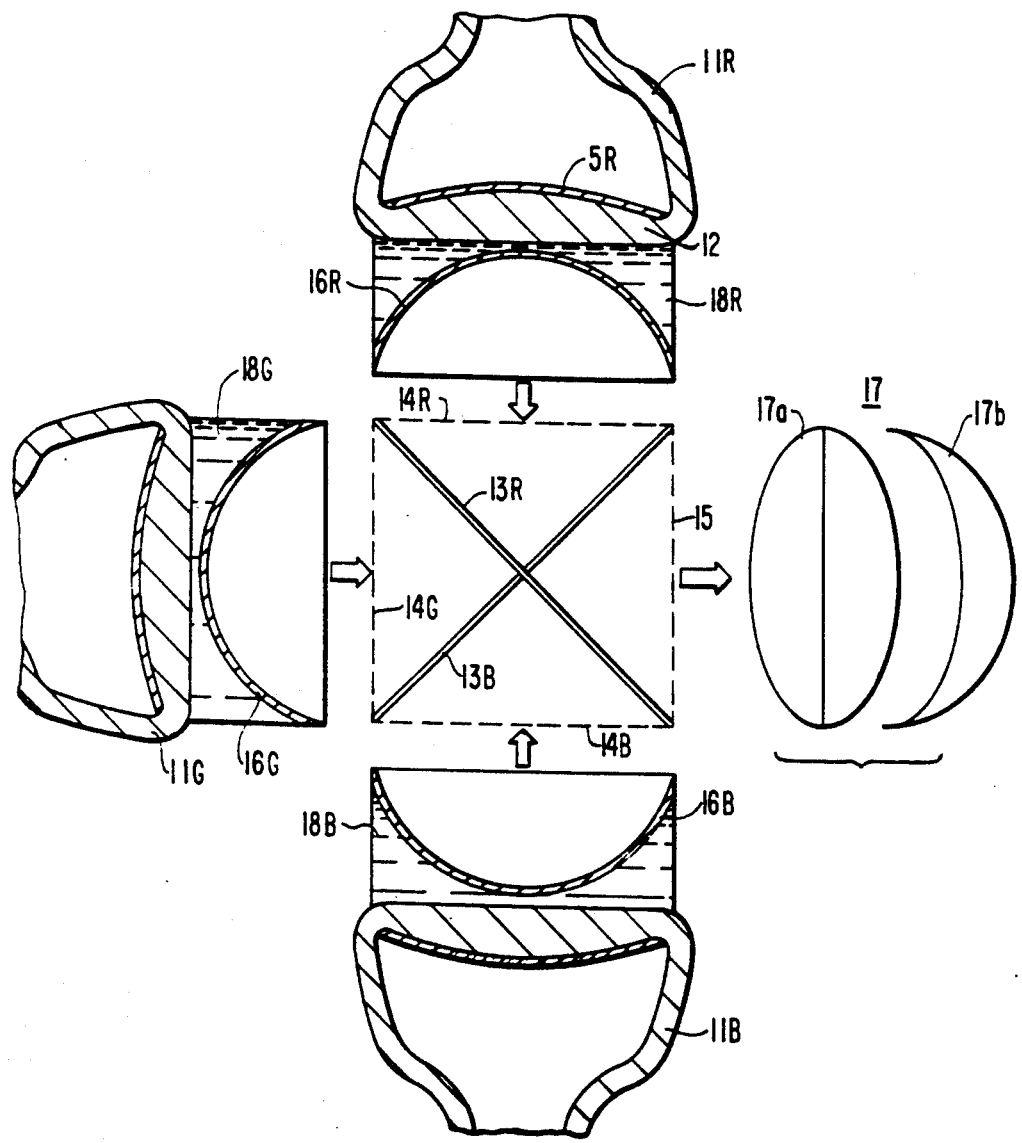
FIG. 3 shows a dichroic video image projection system in accordance with the invention.

The CRT and projection lens assembly in FIG. 1 is one of three such assemblies in a 3 CRT-3 lens rear projection video projector, such as that shown in the above-mentioned U.S. Pat. No. 4.804.884. The CRT comprises an envelope having a faceplate 1 which is convex on the interior of the tube and is joined by a tapered portion 2 to a neck 3 containing an electron gun 4. The outer surface of the faceplate is usually planar. On the inside surface thereof is an electroluminescent screen 5, usually of phosphor material. A deflection yoke 6 mounted on the envelope deflects the electron beam from the electron gun 4 so as to produce an approximately rectangular scanning raster on screen 5. A field flattening lens element 7 of negative optical power is mounted adjacent faceplate 1, and may have spherical or aspherical surfaces. It serves to flatten the field of the image from CRT screen 5 so it will form a flat field on a projection display screen (not shown). Field flattener element 7 may be solid or may be partially liquid so as to provide a cooling medium for faceplate 1. A short focal length lens assembly 8, having several optical elements at least one of which is of positive power, is adjacent the field flattener element 7 and serves to project and focus the image from CRT screen 5 so as to fill the projection display screen. Thus, the combination of lens assembly 8 and field flattener element 7 forms a composite projection or objective lens, there being one such lens for each CRT.

As described above, the images produced by the three CRTs in the projector are nominally monochromatic red, green and blue respectively, and when combined form the composite projected color image. In order to provide correct chromaticity and adequate brightness balance in the projected image, as well as to reduce chromatic aberration in the projection lens, it is important for each CRT to have a relatively narrow spectral characteristic. For that purpose, as well as to provide a gain in luminance, a multi-layer interference filter is provided as a coating between the phosphor screen 5 and faceplate 1 of the CRT. As disclosed in U.S. Pat. No. 4,804,884, such a filter is an internally angularly reflecting coating (IARC).

FIG. 2 shows, as described in the above patent, a CRT faceplate 1 having deposited on the inner surface thereof such an IARC interference filter. Such filter comprises successive layers of dielectric material having a relatively high (H) refractive index (from 2.0 to 2.35) and a relatively low (L) refractive index (from 1.38 to 1.47), the layer thickness being a function of the central wavelength of the nominal color of the CRT monochrome image. The electroluminescent phosphor screen 5 is formed as a layer applied over the filter 9. A thin aluminum backing film 10 is applied over the phosphor layer to conduct away the electron beam current and also to reflect back light from such layer.

FIG. 3 is a top view, partially in section, of a video image projection arrangement in accordance with the invention. It comprises these monochrome image display devices in the form of CRTs 11R, 11B, 11G and an orthogonally crossed pair of red and blue reflective dichroic mirrors 13R, 13B. The four quadrants defined by such mirrors are air filled, and such quadrants together with the mirrors form a dichroic block. The CRTs are each substantially as described above with reference to FIGS. 1 and 2, and respectively produce substantially monochromatic red, blue and green components of the composite color image be projected. However, for purposes of the present invention the radius of curvature R of the convex inner surface of the faceplate of each such CRT is of particular significance.

If a field flattener were not provided, for a typical rear projection lens design a substantially flat projected image plane could be obtained if R is approximately equal to the raster diagonal D, i.e. about 130 mm. However, such extreme degrees of curvature create problems in design and operation of the CRT. Accordingly, the radius of curvature R of each CRT should substantially exceed D, such as in the range from about 2 D to 4 D. With such moderate curvature, a field flattener is necessary between the faceplate and the dichroic block. For a typical 7" CRT, which has a nominal 5" raster diagonal (D=127 mm), the radius of curvature R will be from about 200 to 500 mm, and preferably not less than 250 mm.

Light from the red image on screen 5R of CRT 11R is transmitted into an entry side 14R of the dichroic block and reflected by the wavelength selective dichroic mirror 13R; also known as a dichroic filter, so as to exit through exit side 15. Light from the blue image on screen 5B of CRT 11B is transmitted into entry side 14B of the dichroic block and reflected by dichroic mirror 13B, so that it also exits through exit side 15. The light from the green image on screen 5G of CRT 11G is transmitted through both dichroic mirrors into exit side 15. Consequently, light for a composite color image is projected from exit side 15 where it is received by projection lens assembly 16 and imaged on a projection screen (not shown). Such lens assembly includes at least one positive power element, and will generally consist of several elements, some of which are of negative power. In the embodiment in FIG. 3 lens assembly 16 has two positive power elements in the form of a double convex lens 17a and a negative lens element 17b.

As described above, a field flattener is required. To function as a field flattener a lens element must have negative power and be positioned relatively near the faceplate and relatively far from the principal positive element of the lens. Therefore, respective field flatteners such as meniscus elements 16R, 16B and 16G are assembled to the faceplates of the respective CRTs 11R, 11B and 11G. Each field flattener meniscus element is preferably "liquid immersed" with the associated faceplate, meaning that the junction therewith may be a liquid coolant, a gel or a cured plastic. Such immersants 18R, 18B and 18G are shown in FIG. 3.

The principal reason for inclusion of a field flattener at each of the three entrance sides of the dichroic block is, as noted above, to enable use of a moderate faceplate curvature. Since it must be near the faceplate, and there are three faceplates in different positions, three field flatteners are necessary. Only a single set of positive elements of the projection lens is necessary, all located only at the exit side of the dichroic block, thereby achieving reduced cost of the projector.

The light collection efficiency of the lens assembly is not substantially affected by separation of the field flattener from the positive power elements of the projection lens, because the IARC interference filter on the CRT faceplate reduces the angular range of light emission therefrom. Although such separation will increase the overall angular divergence of light from the faceplate incident on the dichroic mirrors, which might seem to be a negative factor, in fact it is not. Applicants have determined that the overall angular divergence over the entire entrance surface of the dichroic mirror block is not what is significant, but rather the angular divergence must be considered for each point on the mirror surfaces individually. Such divergence is greatest at and near the center of the mirror and smallest near the edges. Interestingly, the angular divergence near the center remains almost the same regardless whether there are one or two lens elements at the entrance to the dichroic block.

The increased overall angular divergence of the light incident on the dichroic mirrors is due to the shift of the angles of incidence from one end of the mirror to the other, and such shift can be entirely compensated by varying the cutoff angle of the dichroic mirrors in one direction. That can be accomplished without appreciable additional cost by varying the thickness of the dielectric layers of the dichroic mirrors in a direction perpendicular to the line of intersection of the two mirrors. Such variation in thickness can be achieved either by tilting the mirror substrates during evaporation thereon of the dielectric layers, or by selectively masking the substrate during such evaporation, or both.

The above considerations lead to the conclusion that a compact dichroic projector can be achieved by employing a projection lens wherein only the field flattener element is at each entrance to the dichroic block, and will be substantially superior to a projection lens wherein two or more elements are at each entrance to the block or wherein all elements are at the exit side of the block. This is a totally unexpected result, and makes it possible to employ a projection lens having a focal length substantially shorter than the diagonal of the CRT raster, such as only about 0.7 times the raster diagonal.

For the IARC interference filter, the high index material commonly has an optical refractive index $n_H = 2.35$, and the low index material commonly has a refractive index $n_L = 1.45$. In such filters one wants to make the difference between $n_L$ and $n_H$ as large as possible, since the smaller the difference therebetween the more layers are needed.

The dichroic mirrors 13A and 13B are also composed of alternating layers of high and low refractive index dielectrics deposited on a substrate, generally glass, although it can be plastic. The substrate may be a planoplano sheet or a plano surface of an optical element (lens or prism). The most common high and low refractive index materials are TiO2 and SiO2, and the most common dichroic mirrors are of the quarter wave type, or modifications thereof, either short-wave-pass or long-wave-pass filters.

The angle of the respective optical axes on the dichroic mirrors is 45°. There is refraction of light on all surfaces of the $n_L$ and $n_H$ layers, and the angle with respect to the normal to the mirrors is much smaller in the high index layers than in the low index layers. The Applicants herein have found that the red, green and blue light combining properties of the dichroic block are favorably affected when $n_L$ is increased, in particular when a block with liquid immersion rather than an air filled block is employed. Of course, this will require a larger number of layers in the filter.

Figure 4:
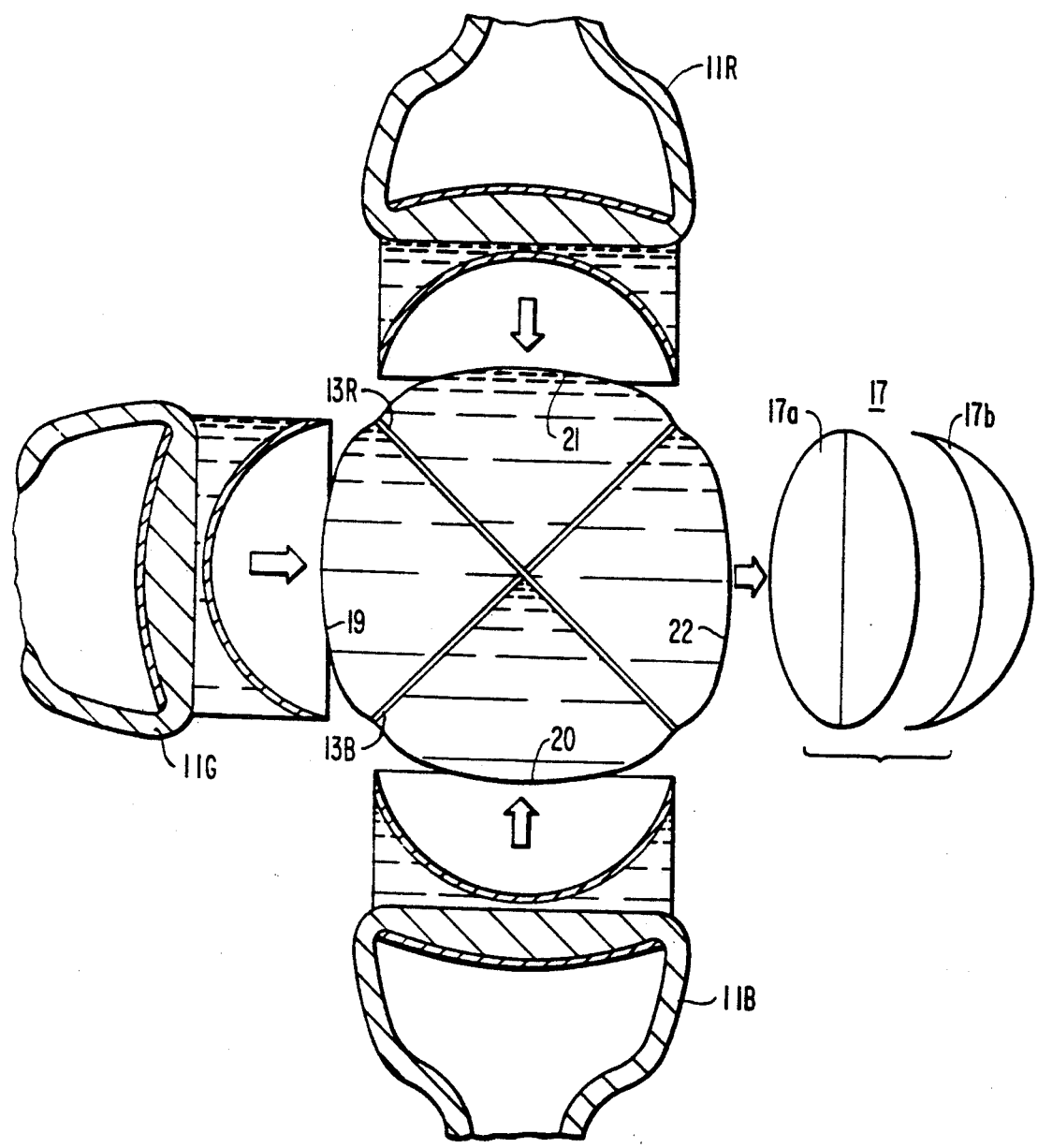
FIG. 4 is an alternative embodiment of the projection system in FIG. 3.

In FIG. 4 is shown another embodiment of the invention employing such liquid immersion of the dichroic block. This results in refraction of the light rays upon entering the dichroic block. Such refraction increases the angular light collection efficiency and improves the brightness on the projection screen. The index material "immersing" the dichroic mirrors may be a liquid, gel or cured plastic. Alternatively, the block can be fabricated from solid wedges (glass or plastic) with the dichroic mirror coatings either deposited on the appropriate faces of the wedges, or first formed on thin substrates which are then applied to such surfaces. The embodiment in FIG. 4 makes it possible to provide positive lens power in the dichroic block itself with a block having a refractive index greater than unity, the windows 19, 20 and 21 facing the CRTs and/or the window 22 facing the projection lens elements having spherical or aspherical surfaces. When the curvatures are convex in a direction away from the mirrors the dichroic block will act as a positive lens element, thereby reducing the positive lens power required for the other elements of the projection lens for a given focal length.

The field flattener is typically positioned so its center is within 15 mm of the CRT faceplate. If liquid for cooling and optical coupling is present, filling the space between the faceplate and a meniscus element, then the entire structure consisting of the faceplate, the liquid and the optical material(s) of which the meniscus element is composed functions collectively as a composite field flattener. In the preceding text and the appended claims it has been emphasized that there is only one lens element at each entrance to the dichroic block. By this is meant an element having an appreciable optical power. Since the presence of a coupling liquid having nearly the same refractive index as the CRT faceplate will not result in appreciable refraction of light passing from the faceplate into the liquid, that boundary would not constitute a lens element surface as referred to herein. The combination of faceplate, liquid and meniscus element is in this sense only a single lens element, i.e., the field flattener.

A further requirement of the structure herein, as described, is that there is no separate positive power lens element at the entrance sides of the dichroic block. This means that there are two basic possibilities. The first possibility is that in going from each faceplate to the dichroic mirrors there are the following interfaces: faceplate glass to relatively high refractive index coupling liquid, to plastic (or glass) field flattener, to air, to dichroic block. In such case, wherein the dichroic block is air filled, there is only one interface where appreciable refraction occurs; namely, the field flattener to air interface. Consequently, the field flattener element is the one (negative power) lens element on the entry side of the dichroic block.

The second basic possibility is that in going from each faceplate to the dichroic mirrors there are the following interfaces: faceplate glass to relatively high refractive index coupling liquid, to plastic (or glass) field flattener, to air, to plastic (or glass) enclosure of the immersed (higher refractive index) dichroic block, which filled block may have curved entrance and/or exit windows. In this second case, there is appreciable refraction at both the field flattener to air interface and the air to dichroic block interface. Again, in this case, the field flattener element is the only (negative power) lens element between the CRT and the dichroic block and the block itself acts as a (positive power) lens element. In this latter case, there is one air gap between the field flattener and the dichroic block. When the high refractive index material filling the dichroic block is a liquid, such liquid may be different from the cooling/coupling liquid for the CRT faceplate.

Although the field flattener preferably consists, as described, of coupling liquid and one plastic or glass element, there are other possible alternatives: the coupling liquid may for example be replaced by a transparent gel.

DICHROIC BLOCK CONSTRUCTION

Various modes of construction of the dichroic block are possible. If it is liquid filled, as described above, windows and means to contain the liquid must be provided. Such windows may be flat or curved. The dichroic mirrors must then be supported only by their edges. If a liquid solution is employed which can be converted to a gel after filling the cavity, the possibility of subsequent leaks will be avoided and the gel would also provide some support for the mirrors. Another approach is to replace the window and the liquid or gel with a dichroic block built from plastic or glass wedges. The dichroic mirrors would then be formed directly on plastic or glass wedges, or on thin substrates attached to wedges which are then assembled, preferably with an adhesive, into a solid dichroic block. The faces of the wedges which form the windows for passage of projected light may be plano or preferably curved so that one or more have positive power. Glass wedges with positive power can be prepared by conventional grinding and polishing techniques. A variant of this approach would be to attach plano convex glass lenses to the faces of the wedges of the dichroic block with adhesives.

A final variation would be to prepare a dichroic block by providing a cavity in which the dichroic mirrors, preferably on thin plano glass substrates, are positioned, and then filling the cavity with a solution of a polymer and monomer mixture. The cavity may be closed prior to or after adding the liquid, depending on the process employed to polymerize the monomer. Once the plastic is cured the cavity is opened and a dichroic block complete with windows is removed. Studs, or other mechanical parts, may be placed in the cavity prior to polymerizing the plastic to provide for mounting of the dichroic block, or pegs, holes, or other mounting aids may be molded into the block.

A certain amount of the light passing into the dichroic block from one CRT may be reflected or transmitted by the dichroic mirror surfaces toward another CRT rather than towards the projection screen, and may reflect from the CRT and so reduce image contrast. A convenient method of absorbing such light is to introduce dye into one or more of the liquid chambers of the dichroic block. The liquid filling the field flattener could also include a dye, a different dye for each CRT. Such dyes should absorb much of the light received from the dichroic block but still be substantially transparent to light from the CRT which is cooled by the said liquid. U.S. Pat. No. 4,633,131 and 4,572,984 describe the use of dyes to remove portions of light emitted by phosphors with side lobes or excessive spectral width to improve the chromaticity of a projector. Thus although the use of CRTs with IARC interference filters, as described herein, will largely eliminate such undesired side lobe emission, a dye may be employed to remove light passing from one CRT through the dichroic block into a region through which light from another CRT must also pass in order to reach the projection screen, since the desired light in such region will be of a different color.

TYPICAL PARAMETERS

A projection system embodying the invention may typically utilize seven inch CRTs (nominal 5" raster diagonal, D - 127 mm) with plano-convex faceplates having an inner convex surface with a radius of curvature of 350 mm. The field flattener elements can be plastic meniscus lenses with liquid coupling to the faceplates. The projection lens f number may be between 0.9 and 1.2, with a focal length between 80 mm and 120 mm. The dichroic mirrors can be formed by deposition of dielectric layers on one side of plano-plano glass substrates, the other sides being coated with an anti-reflective coating optimized for 45° incident light. The edges of the dichroic mirrors at their line of intersection should be mitered to avoid a gap between them. The dielectric layers on the mirrors should vary in thickness in the direction normal to the line of their intersection in order to optimize them for the mean angle of the light rays which pass through, and can be composed of $SiO_2$ as the low index material and $TiO_2$ as the high index material.

The embodiment depicted in FIG. 3, employing air immersed dichroic mirrors, can be used with a front projection display screen. The embodiment in FIG. 4, employing dichroic mirrors which are liquid immersed and having transparent windows at the sides of the block to enclose the liquid, is the preferred embodiment for rear projection display.

The transparent windows 19, 20, 21 and 22 can be flat, convex or concave, (e.g. meniscus in form), preferably provided on the air side thereof with anti-reflection coatings. The refractive index of the immersion liquid may be between 1.25 and 1.45. An anti-reflection coating can be provided on the opposite side of the dichroic mirror substrates.

Instead of liquid immersion the immersion material may be plastic. The dichroic block can then formed by molding plastic around the mirrors using a tooled mold. This is a potentially low cost embodiment of the invention for large scale manufacturing. The preferred plastic is acrylic, such as polymethacrylate. The dichroic block can also be constructed using glass prisms, as described above.

LIQUID COOLING

Liquid cooling can be employed for the CRT faceplates. A cooling liquid having a low vapor pressure with a broad range of service temperatures, such as ethylene glycol and water mixtures, enables the CRTs to operate at higher electron beam currents without excessive temperature rise which could cause thermal saturation of the phosphors of the luminescent screen and/or breakage of the faceplate. The refractive index of the liquid coolant is preferably close to the refractive indices of the faceplate and the meniscus element, in order to reduce unwanted reflections of light at such interfaces and thus improve the brightness on the projection screen and contrast. Another advantage of liquid or other optical coupling in a dichroic mirror projector is that the minimum rear focal length of the projection lens afforded by a given light path geometry is reduced. However, this benefit is not as great as that achieved by immersing the dichroic mirrors in an optical medium of refractive index greater than one, i.e. in any medium other than air, because in the latter case the optical thickness of the dichroic block is so large that the reduction in optical thickness, i.e. apparent thickness caused by the immersion medium, is much greater.

Although the invention has been described with reference to certain preferred embodiments thereof, it will be apparent to those skilled in the art that various modifications and adaptations of such embodiments may be made without departing from the teachings and scope of the invention as set forth in the ensuing claims.

What is claimed is:

1. Apparatus for projecting on a display screen a composite color video image formed from three monochrome raster images respectively produced on the faceplates of three monochrome image display devices; the faceplate of each display device being convex on the interior surface thereof and having an interference filter deposited thereon in the form of an internal angularly reflective coating (IARC), said filter narrowing the spectral range and the angular distribution of the light rays from the monochrome raster produced on said faceplate; characterized in that said projection apparatus comprises:
   a pair of crossed dichroic mirrors forming a four-sided dichroic block for receiving in three respective entrance sides thereof the light rays from the three monochrome rasters on said faceplates and combining them to provide composite color light rays corresponding to a color video image, such composite color light rays being projected through an exit side of said block;
   a single lens element between the faceplate of each of the respective display devices and the respective entrance sides of said dichroic block; and
   an assembly of lens elements for receiving said composite color light rays from said dichroic block and projecting them on said display screen to form said color image thereon, said assembly including at least one optically positive lens element and forming together with said single lens elements a projection lens of which all elements except said single lens elements are located between said exit side of said dichroic block and said display screen.

2. Color video image projection apparatus as claimed in claim 1, wherein each of said single lens elements is a field flattener lens element for effecting focus field correction of the monochrome image received from the faceplate of the display device optically coupled thereto, such field correction serving to flatten said projected color image on said display screen.

3. Color video image projection apparatus as claimed in claim 2, wherein each of said field flattener lens elements comprises a plastic or glass lens element of negative optical power and a liquid immersant for coupling such lens element to the relevant faceplate.

4. Color video image projection apparatus as claimed in claim 2, wherein said crossed dichroic mirrors intersect substantially orthogonally so as to form four quadrants there-between, said quadrants being air-filled.

5. Color video image projection apparatus as claimed in claim 1, wherein said crossed dichroic mirrors intersect substantially orthogonally so as to form four quadrants there-between, each of said quadrants including a liquid immersant from the group consisting of a liquid, a gel, and a polymer.

6. Color video image projection apparatus as claimed in claim 5, wherein said immersed dichroic block has one or more curved outer surfaces of positive optical power.

7. Color video image projection apparatus as claimed in claim 1, wherein each of said crossed dichroic mirrors comprises a planar substrate which is coated on one surface thereof with successive layers of dielectric material of high and low refractive index.

8. Color video image projection apparatus as claimed in claim 7, wherein said low refractive index is at least 1.4, said high refractive index is at least 2.0, and the difference there-between is at least 0.45.

9. Color video image projection apparatus as claimed in 1 claim 7, wherein the optical thickness of said layers of dielectric material varies in a direction perpendicular to the line of intersection of said crossed dichroic mirrors.

10. Color video image projection apparatus as claimed in claim 1, wherein the radius of curvature of the convex interior surface of the faceplate of each of said display devices is from two to four times the diagonal of the image raster on said faceplate.

11. Color video image projection apparatus as claimed in claim 1, wherein said projection lens has a focal length between 0.5 and 0.9 times the diagonal of the image raster on the faceplate of each of said display devices.

12. Color video image projection apparatus as claimed in any of claims 1–11, wherein each of said monochrome image display devices is a cathode ray picture tube.

* * * * *